(12) United States Patent
Inoue

(10) Patent No.: US 8,390,756 B2
(45) Date of Patent: Mar. 5, 2013

(54) BACKLIGHT UNIT, METHOD FOR ASSEMBLING THE SAME AND LIQUID CRYSTAL DISPLAY DEVICE USING THE BACKLIGHT UNIT

(75) Inventor: Kaoru Inoue, Saitama-ken (JP)

(73) Assignee: Japan Display Central Inc., Fukaya-shi (JP)

( * ) Notice: Subject to any disclaimer, the term of this patent is extended or adjusted under 35 U.S.C. 154(b) by 833 days.

(21) Appl. No.: 12/499,942

(22) Filed: Jul. 9, 2009

(65) Prior Publication Data

US 2010/0014026 A1    Jan. 21, 2010

(30) Foreign Application Priority Data

Jul. 17, 2008  (JP) ............................... P2008-185825

(51) Int. Cl.
*G02F 1/1333* (2006.01)
(52) U.S. Cl. ............ 349/58; 349/65; 362/633; 362/97.1
(58) Field of Classification Search .................... 349/65, 349/58, 67; 362/615, 611, 612, 632, 633, 362/634, 97.1, 97.2
See application file for complete search history.

(56) References Cited

U.S. PATENT DOCUMENTS

| 7,956,952 B2 * | 6/2011 | Tanaka ............................ 349/61 |
| 2008/0080209 A1 * | 4/2008 | Shin et al. ..................... 362/607 |
| 2008/0278656 A1 * | 11/2008 | Yuan ............................... 349/58 |

FOREIGN PATENT DOCUMENTS

JP    2006-216244    8/2006

* cited by examiner

*Primary Examiner* — Thoi Duong
(74) *Attorney, Agent, or Firm* — Oblon, Spivak, McClelland, Maier & Neustadt, L.L.P.

(57) ABSTRACT

A back light unit includes a light guide plate having a rectangle shape with first and second edges and a light source having a light element to emit light to a first edge of the light guide plate. The light guide plate emits the incident light from the light source to a liquid crystal display panel as a flat light source. An elastic frame is integrally formed with first and second frame elements in a rectangle shape so as to surround the light guide plate. The light source includes a metal frame clipped by a clip shape implemented provided in the first frame element. The first edge facing the second edge of the light guide plate is fitted to the metal frame. The second edge of the light guide plate is fitted to a second frame element having a clip portion for clipping the light guide plate.

11 Claims, 4 Drawing Sheets

BACKLIGHT UNIT, METHOD FOR ASSEMBLING THE SAME AND LIQUID CRYSTAL DISPLAY DEVICE USING THE BACKLIGHT UNIT

CROSS-REFERENCE TO RELATED APPLICATIONS

This application is based upon and claims the benefit of priority from prior Japanese Patent Application No. 2008-185825 filed Jul. 17, 2008, the entire contents of which are incorporated herein by reference.

BACKGROUND OF THE INVENTION

1. Field of the Invention

The present invention relates generally to a backlight unit, and more particularly to an elastic frame for holding a light guide plate and the like, and a method for assembling the same. The back light unit can, for example, be used in a liquid crystal display device.

2. Description of the Related Art

A liquid crystal display device is widely used in various fields of electrical equipment as a flat-screen display device, providing advantages such as lightness, thin profile, and low power consumption. A transmissive type liquid crystal device includes a back light unit having a surface light source for illuminating a liquid crystal panel from a back side. Such transmissive type liquid crystal devices display pictures, in which a light from the back light unit is selectively transmitted through each cell of the liquid crystal device to the viewer.

The backlight unit used as a surface light source is classified into two types, an edge emission type, and a direct emission type, depending on where the light source is located. For example, the edge emission type includes a plurality of line light sources such as cold cathode fluorescent lamps (CCFLs) and a plurality of point light sources (LEDs) for emitting light to an edge of a light guide plate that faces the liquid crystal display panel. On the other hand, the direct emission type includes a plurality of line shaped light sources such as CCFLs arranged on a rear side of the liquid crystal display panel and a diffusion panel between the liquid crystal display panel and the light source. The edge emission type has an advantage of slimness and is suitable, for example, for displays implemented into a mobile electrical equipment or a note type personal computer.

In the back light unit of the edge emission type, the light guide plate and the light source are held by a frame for surrounding the light guide plate. Thus, a construction is proposed to sandwich the light guide plate between a frame and a back cover at a peripheral region. Another construction, to attach the light guide plate to the frame by a double stick tape, is also proposed.

FIG. 10 shows one example of a construction in which a light guide plate is sandwiched between a frame and a back cover. In this example, a light guide plate 103 and a reflector 104 are held between a rigid plastic frame 101 and a back cover 102 named as a rear vessel and an optical sheet 105 is arranged on the light guide plate 103.

FIG. 11 shows another example of a construction in which a light guide plate 202 is adhered to a frame by a double stick tape. In this example, the light guide plate 202 is arranged on a support element 201a provided at a rear portion of a frame 201 made of rigid plastic and extending inside a display region. The light guide plate 202 is adhered to the support element 201a by a double stick tape 203. A reflector sheet 204 is inserted between the light guide plate 202 and the support element 201a and an optical element 205 is arranged on the light guide plate 202.

Further, Japanese laid open patent application 2006-216244 discloses a construction for holding a light guide plate in which first and second internal frames both made of metal are paired with each other so as to hold the light guide plate. A first metal internal frame of a clip shape has three edges for holding the light guide plate, except one edge for receiving emitted light from a light source such as LEDs. On the other hand, the second internal frame made of metal that contains a light source is fitted along a light incident edge of the light guide plate so as to maintain a gap between the emitting surface of LEDs and a light incident surface of the light guide plate.

However, if the construction in which the light guide plate is held by combining the frame and the back cover is adopted, disadvantages such as high cost and weight gain result because the back cover is expensive and heavy. Further, time to assemble is high because the light guide plate is fitted to both of the frame and the back cover.

On the other hand, if the construction in which the light guide plate is attached to the frame by a double stick tape is adopted, a lack in uniformity of brightness may be observed because a light absorption condition of the light guide plate changes depending on the way the double stick tape is attached. Furthermore, if the tape is directly adhered to the light guide plate to hold the light guide plate by the frame, spots in an image due to non-uniformity of adhesion of the tape may be generated, and which also may result in a lower luminance because light is absorbed by the tape.

The construction shown in the Japanese Laid Open Patent Application 2006-216244 may result in high cost and weight gain because the first and second internal frames are made of metal. Further, it is required to fit the first and the second frames made of rigid metal to the light guide plate, respectively. Therefore, the assembly of the backlight unit is complicated and the completed backlight unit is unstable in use because the first and second internal frames are not formed integrally.

BRIEF SUMMARY OF THE INVENTION

The present invention has been made to address the above mentioned problems.

An advantage of the present invention is to provide a back light unit where an assembly is simply and increase in production cost and weight of back light unit is avoided.

Another advantage of the invention is to provide a display having high quality without spots in an image and a lower luminance.

According to one aspect of the invention, there is provided a back light unit including: a light guide plate having a rectangle shape, the light guide plate including a first and a second edges facing each other; a light source having a light element for emitting light to the first edge of the light guide plate, the light guide plate emitting the incident light from the light source to a liquid crystal display panel as a flat light source; and an elastic frame integrally formed and surrounding the light guide plate, the elastic frame including first and second frame elements facing each other, wherein the light source is fitted to the first frame element of the elastic frame and a clip portion for clipping the second edge of the light guide plate is provided in the second frame element of the elastic frame.

According to another aspect of the invention, there is provided a liquid crystal display device including a liquid crystal display panel having a liquid crystal layer between a pair of substrates; a light guide plate for illuminating the liquid crystal display panel, the light guide plate including first and second edges facing each other; a light source having a light element for emitting light to the first edge of the light guide plate, the light guide plate emitting the incident light from the light source to the liquid crystal display panel as a flat light source; a rectangular elastic frame surrounding the light guide plate, the elastic frame including a first and a second frame elements facing each other, the first and second frame elements each including a bottom plate and a sidewall connected to the bottom plate; a peak element provided at an intermediate area of the sidewall of the second frame element along the second frame element, the peak element forming a clip portion for clipping the second edge of the light guide plate with the bottom plate; and a light source container fitted to the first frame element and in which the light source is contained, the light source container having a clip shape with an opening facing the second frame element, wherein the first edge of the light guide plate is fitted to the light source container provided in the first frame element and the second edge of the light guide plate is clipped by the clip portion of the second frame element.

According to other aspect of the invention, there is provided a method for assembling a back light unit having a light guide plate and a light source for emitting light to the light guide plate, including: providing an elastic frame having first and second frame elements facing each other for holding the light guide plate and the light source, each of the first and second frame elements having a bottom plate and a sidewall built on the bottom plate; forming a light source container for containing the light source, the light source container having a clip shape with an opening; fitting the light source container in the first frame element; forming a peak element in an intermediate area on the sidewall along the second frame element, the peak element forming a clip portion with the bottom plate for clipping the light guide plate; temporarily fixing the first edge of the light guide plate in the light source container; expanding the second frame element in a direction departing from the first frame element while twisting the second frame element in an above direction; fitting the second edge of the light guide plate into the expanded and twisted second frame element; and reconstituting the expanded and twisted second frame element to the original shape after containing the light guide plate.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
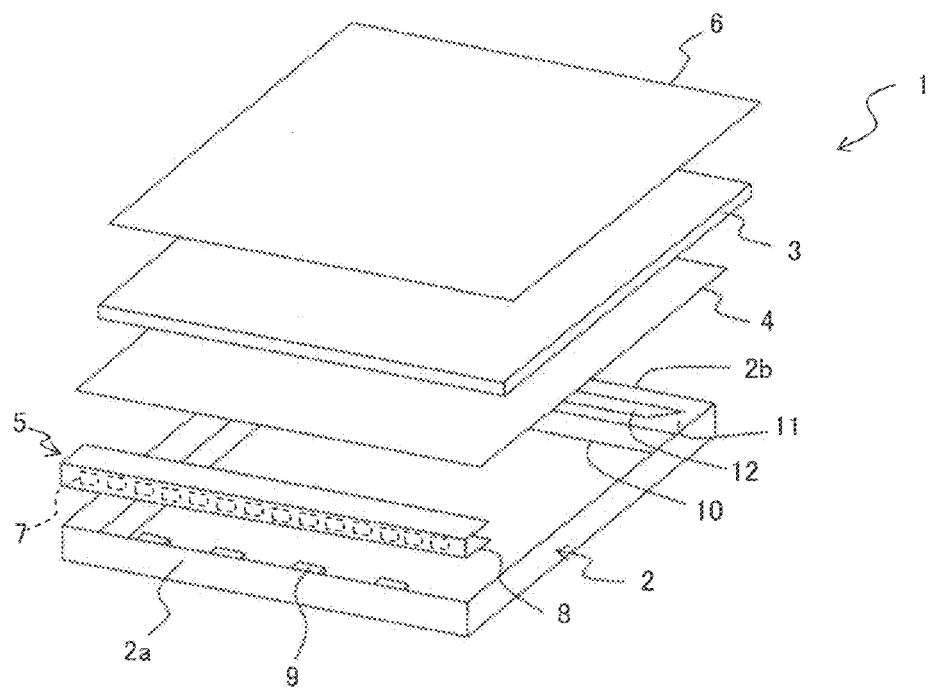
FIG. 1 is an exploded perspective view showing a back light unit according to a first embodiment of this invention.

A backlight unit according to an exemplary embodiment of the present invention, in particular, an elastic frame for containing a light guide plate and the method for assembling the same will now be described with reference to the accompanying drawings wherein the same or like reference numerals designate the same or corresponding parts throughout the several views.

FIG. 1 shows a backlight unit according to a first embodiment of this invention. An approximately rectangle light guide plate 3 and a reflective sheet 4 are held by an elastic frame 2 made of elastic resin such as plastic with a rectangle shape that surrounds four edges of the light guide plate 3 and the reflective sheet 4. A light source 5 is provided at an elastic frame element 2a of the elastic frame 2 facing one edge of the light guide plate 3 and an optical sheet 6 is arranged on the light guide plate 3.

The light source 5 includes light elements such as LEDs implemented on a printed 30 circuit substrate. The light source 5 also includes a reflective metal frame 8 that is fixed to the elastic frame element 2a having an opening toward the display area. The elastic frame element 2a includes a plurality of locking parts 9 provided at a sidewall and a bottom plate 10 of the elastic frame element 2a so as to extend toward inside of the display area. The metal frame 8 is inserted and fixed between the locking parts 9 and a bottom portion 10 with an elastic strength of the elastic frame element 2a.

Emitted light from the light elements 7 enters into an edge of the light guide plate 3, is reflected by the metal frame 8 and then is converted to a flat light. In this embodiment, the reflective sheet 4 and the optical sheet 6 are arranged on both surfaces of the light guide plate 3. The incident light to an edge of the light guide plate 3 is reflected by the reflective sheet 4, and travels in the light guide plate 3 while the other incident light directly travels without being reflected. The incident light is emitted to a liquid crystal display panel through the optical sheet 6. That is, the incident light from the light source 5 enters into the light guide plate 3 and is emitted to the liquid crystal display panel as a flat light source. This embodiment is a back light unit of an edge emission type because the light from the light source 5 enters from the edge of the light guide plate 3.

In this embodiment, the light source 5 is formed by linearly arranging light elements such as LEDs, however, a line light source such as CCFL may be used.

On the other hand, the elastic frame 2 having four edges is integrally made by a resin material such as plastic that has an elastic characteristic so as to wholly surround four edges of the light guide plate 3. If the frame 2 is made of metal, the weight of the frame 2 becomes large. Further it becomes difficult to smoothly fit the light guide plate 3 into the frame 2 because of difficulty of making the frame 2 transform. Similarly, if a rigid plastic frame is used, it also becomes difficult to transform the frame 2, which prevents the light guide plate 3 smoothly fitting into the frame 2. Accordingly, in this embodiment, it is required to use the elastic frame 2 that is integrally formed in correspondence with the edges of the light guide plate 3. If the elastic frame 2 is divided into a plurality of frame pieces, the assembly process becomes complicated and assembled modules may be unstable in use.

Figure 2:
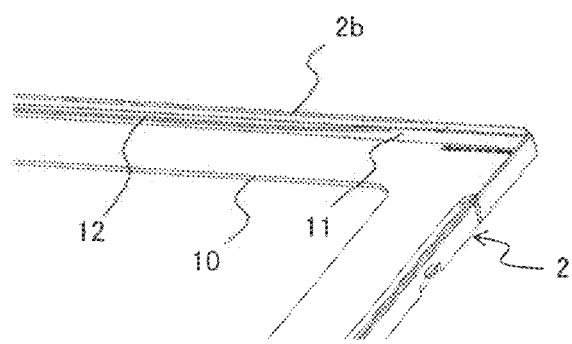
FIG. 2 is a perspective view of a main portion of an elastic frame according to the first embodiment of the invention.
Figure 3:
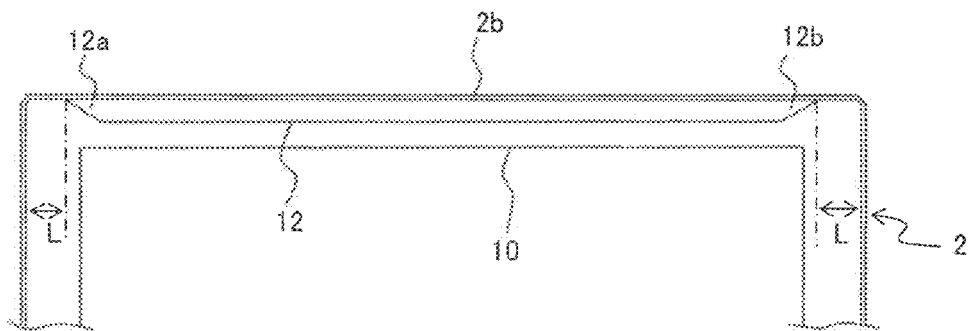
FIG. 3 is a plan view of main portion of the elastic frame according to the first embodiment of the invention.

The elastic frame 2 includes four frame elements 2a, 2b, 2c and 2d, each of which is fitted to the corresponding edge of the light guide plate 3. Further, each of the frame elements 2b, 2c and 2d includes a bottom plate, side wall and a peak element formed to an intermediate area of the side wall along the frame element so as to form a clip portion for clipping the light guide plate 3 and reflective sheet 4. As shown in FIGS. 2 and 3, the peak element 12 is integrally formed at an approximately half the distance of a height of the side wall, extending to inside of the elastic frame 2. The peak element 12 is arranged so as to contain the light guide plate 3 and the reflective sheet 4 between the peak element 12 and the bottom plate 10 with an enough gap therebetween.

The peak element 12 may be formed in the whole range of the frame element 2b of the elastic frame 2. However, it is desirable not to have the peak elements at both edge portions of the frame element 2b because, if the peak element 12 is formed in the entire range of the frame element 2b, it may limit elastic transformation of the elastic frame element 2b. In this embodiment, the peak element 12 is formed 20 mm apart from the ends of the elastic frame element 2b in case that a frame element 2b of 300 mm length is used. Of course, the length (L) of the frame element 2b where the peak element is not formed at the edge portions can be selected corresponding to a dimension of the frame element 2b so as to smoothly assemble the light guide plate 3.

In this embodiment, if corner portions of the peak element 12 have rectangle shape, the surface of the light guide plate 3 may be scratched. Accordingly, it is desirable to taper the edge portions 12a and 12b of the peak element 12. If the edge portions 12a and 12b are tapered toward the edges, the insertion of the light guide plate 3 and the like into the clip portion becomes smooth and easy.

The light source 5 includes a metal frame 8 having a longitudinal clip shape and opening so as to face the light guide plate 3. LEDs are lineally arranged in the metal frame 8 along its longitudinal direction. The metal frame 8 is fixed between a plurality of locking parts 9 and the bottom plate 10 of the frame element 2a using the elastic characteristics of the elastic frame.

Figure 4:
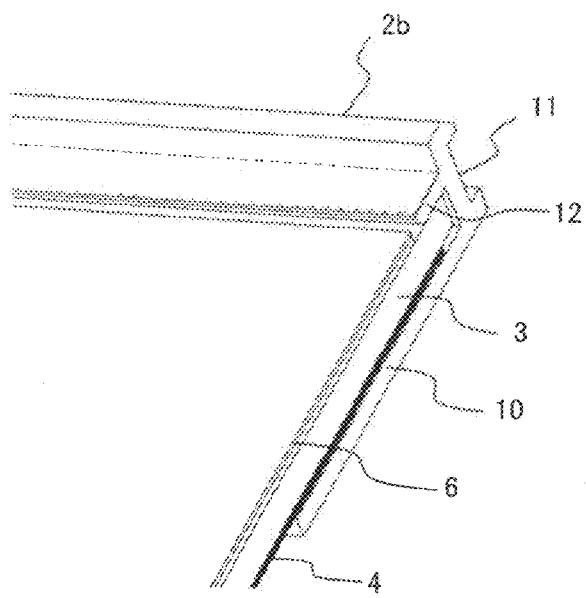
FIG. 4 is a fragmentary exploded perspective view showing a construction where a light guide plate is fixed to the elastic frame according the first embodiment of this invention.

FIG. 4 shows a construction in which the light guide plate 3 is fitted to the elastic plastic frame element 2b. Ends of the respective edges of the light guide plate 3 and the reflective sheet 4 are inserted into the clip portion of the frame element 2b together so as to clip them between the peak element 12 and the bottom plate 10. Other opposing ends of the light guide plate 3 and the reflective sheet 4 are fitted into the metal frame 8 provided with LEDs. As a result, the light guide plate 3 and the reflective sheet 4 are contained in the elastic frame.

Figure 5:
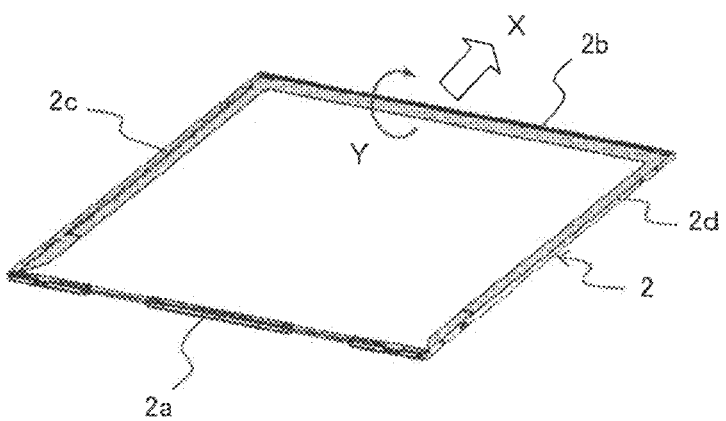
FIG. 5 is a view showing a way to fit the light guide plate to the elastic frame according to the first embodiment of this invention.
Figure 6:
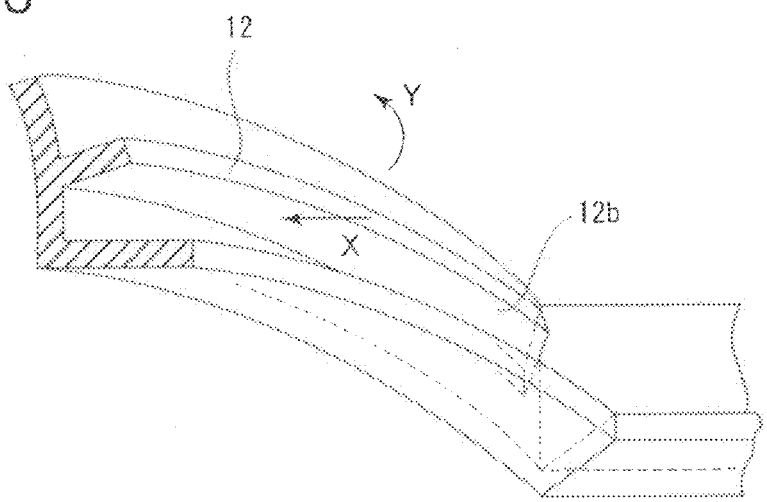
FIG. 6 is an enlarged perspective view taken along line III-III of FIG. 3 showing a way to fit the light guide plate to the elastic frame according to the first embodiment of this invention.

A method for fitting the light guide plate 3 and the reflective sheet 4 to the elastic frame 2 will be described below. Firstly, ends of both the light guide plate 3 and the reflective sheet 4 are inserted into the metal frame 8 having a clip shape that constitutes a light source 5 and temporarily fixed to the frame element 2a. Next, as shown in FIG. 5, the frame element 2b of the elastic frame 2 is pulled outwardly in the direction shown by arrow X so as to transform slightly the frame element 2b and expand the frame element 2b while the frame element 2b having the clip portion between the peak element 12 and bottom plate 10 is being twisted in a direction shown by the arrow Y, i.e., about an axis of the frame element 2b. By this twist operation, the opening of the clip portion between the peak element 12 and bottom plate 10 is slightly set toward above direction from a plane position as shown in FIG. 6. Then, the other ends of both the light guide plate 3 and the reflective sheet 4 are inserted into the clip portion between the peak element 12 and the bottom plate 10. Finally, the light guide plate 3 and the reflective sheet 4 are fitted to the elastic frame 2b, by returning the twisted frame portion 2b from the arrow direction Y to the initial position and applying a pressure to the frame element 2b in the opposite direction to the pulled direction X.

According to this embodiment, light guide plate 3 and the reflective sheet 4 are smoothly fitted to the elastic frame element 2b by adopting the above mentioned construction and method. The assembled condition is stable while using the display. Further, an advantage such as lightness is obtained because a metal cover is not required. The holding of the light guide plate is made by inserting one end of the guide plate 3 into the clip portion provided at the elastic frame element 2b. Therefore, it is not required to adhere the light guide plate 3 using a double stick tape, which results in an avoidance of generation of uneven brightness, a lower luminance and display spots due to uneven adhesion of the double stick tape.

Figure 7:
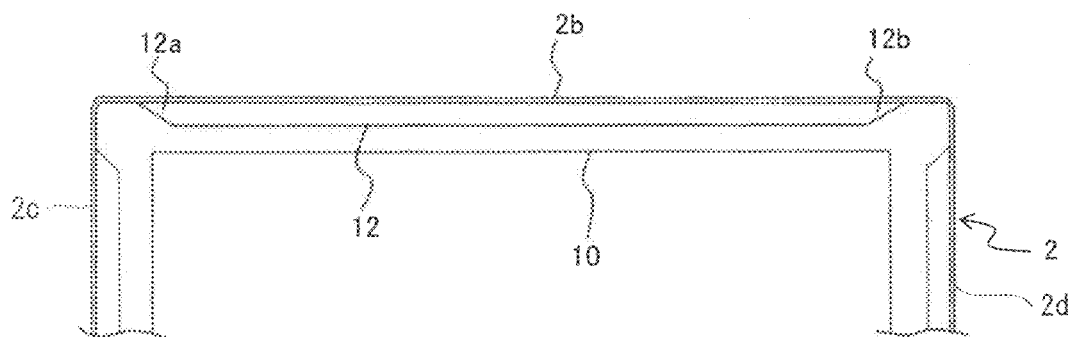
FIG. 7 is a plan view of a main portion of an elastic frame according to a second embodiment of the invention.

FIG. 7 shows a second embodiment according to this invention. In the first embodiment, the peak element 12 to form the clip portion is formed only in the frame element 2b facing the frame element 2a. However, in the second embodiment, the peak elements 12 are also formed in both frame elements 2c and 2d so as to form clip portions, respectively. According to this second embodiment, the light guide plate 3 is fitted to the elastic frame 2 by four frame elements, e.g., three frame elements 2b, 2c and 2d having the clip portion, respectively and the frame element 2a containing the metal frame 8. Therefore, a more stable and complete assembly of the back light unit can be obtained by this embodiment.

Figure 8:
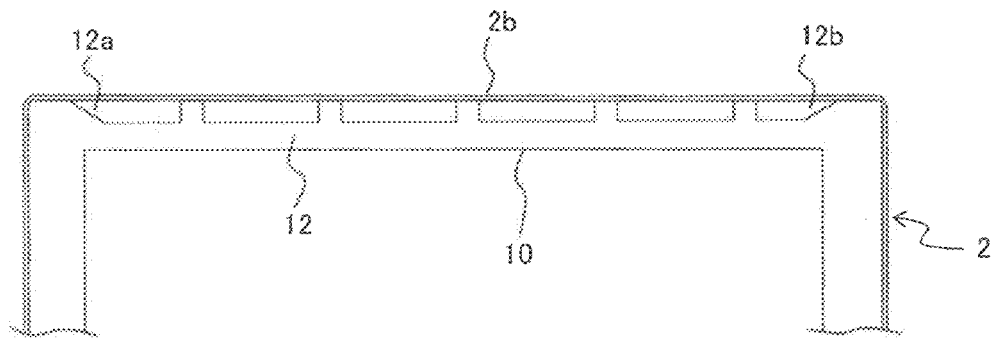
FIG. 8 is a plan view of a main portion of an elastic frame according to a third embodiment of the invention.

FIG. 8 shows a third embodiment according to this invention, in which dividend peak elements 12 are used while a unit peak element 12 is formed along the frame element 2b except at both edge portions of the frame element 2b as in the first embodiment. In this embodiment, due to the divided peak elements 12, the transformation of 2b of the twist operation becomes easier in the assembling process.

Figure 9:
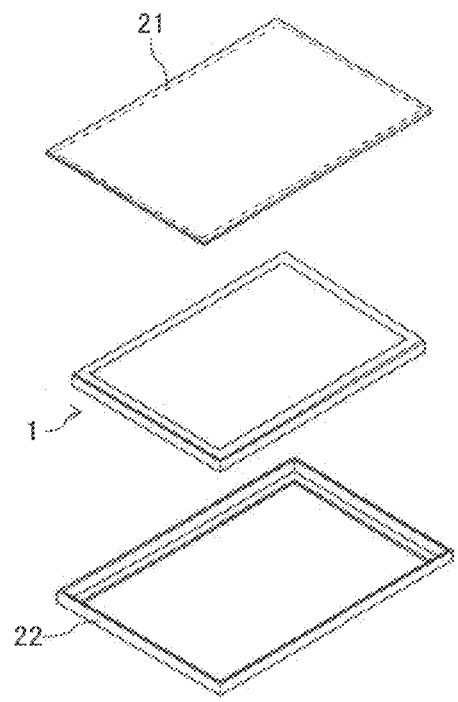
FIG. 9 is an exploded perspective view showing an example of a liquid crystal display device.
Figure 10:
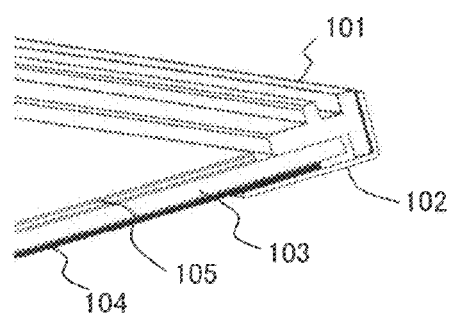
FIG. 10 is a fragmentary exploded perspective view of a conventional back light unit showing a construction where a light guide plate is fixed to a frame.
Figure 11:
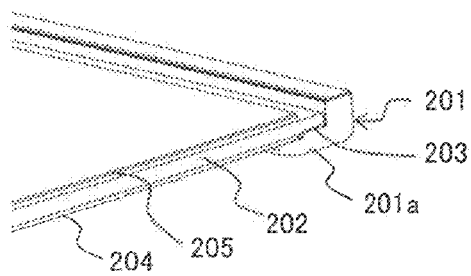
FIG. 11 is a fragmentary exploded perspective view of other conventional back light unit showing a construction where a light guide plate is fixed to a frame.

The above mentioned back light unit 1 is implemented into the liquid crystal display panel as a flat light source. FIG. 9 is a partially exploded view showing a liquid crystal display device containing the back light unit 1.

The liquid crystal display panel 21 is formed by injecting a liquid crystal material between an array substrate and a counter substrate. In the array substrate, picture electrodes and switching elements such as Thin Film Transistors (TFT)s are formed in a matrix shape. Further, the signal lines for supplying picture signals to the picture electrodes and gate lines for supplying switching signals to the TFTs are formed so as to cross each other. On the other hand, a counter electrode made of a transmissive electrode material such as ITO is formed on an approximately entire counter substrate. Filter layers are formed corresponding to each pixel for displaying color pictures on the counter substrate. Polarizers are formed on the outer surfaces of the array substrate and the counter substrate, respectively in which their polarizing axes orthogonally cross each other.

In a peripheral area of the array substrate, a driving circuit portion having driving transistors such as TFTs is provided for supplying switching signals to the switching transistors. That is, pictures are displayed by driving the switching transistors controlled by the driving signals from an outer signal source.

The back light unit 1 is implemented in the liquid crystal display panel 21 as a light source and then the liquid crystal display panel 21 is contained in an outer case 22. The emitted light from the light element 7 is lead to the light guide plate 3, and then converted to a flat light that is emitted to the liquid crystal display panel 21. Characters and pictures are displayed by transmitting the light in the liquid crystal display panel 21.

The present invention is not limited directly to the above described embodiments. In practice, the structural elements can be modified without departing from the spirit of the invention. Various inventions can be made by properly combining the structural elements disclosed in the embodiments. For example, some structural elements may be omitted from all the structural elements disclosed in the embodiments. Furthermore, structural elements in different embodiments may properly be combined.

The invention claimed is:

1. A back light unit comprising:
a light guide plate having a rectangle shape, the light guide plate including first and second edges facing each other;
a light source having a light element to emit light to the first edge of the light guide plate, the light guide plate emitting incident light from the light source to a liquid crystal display panel as a flat light source; and
an elastic frame integrally formed to surround the light guide plate, the elastic frame including first and second frame elements facing each other,
wherein the light source is fitted to the first frame element of the elastic frame and the second frame element includes a clip portion to clip the second edge of the light guide plate,
wherein the second frame element of the elastic frame includes a bottom plate extending to inside of the elastic frame, a side wall connected to the bottom plate and having a peak element provided on the side wall, and a clip portion formed between the peak element and the bottom plate, and
wherein the peak element is formed along a longitudinal direction of the second frame element except for opposite end portions of the second frame element.

2. The back light unit according to claim 1, wherein the peak element includes opposed edges cut away in cross-section.

3. The back light unit according to claim 1, wherein the peak element is formed of plural pieces.

4. A back light unit comprising:
a light guide plate having a rectangle shape, the light guide plate including first and second edges facing each other;
a light source having a light element to emit light to the first edge of the light guide plate, the light guide plate emitting incident light from the light source to a liquid crystal display panel as a flat light source; and
an elastic frame integrally formed to surround the light guide plate, the elastic frame including first and second frame elements facing each other,
wherein the light source is fitted to the first frame element of the elastic frame and the second frame element includes a clip portion to clip the second edge of the light guide plate, and
wherein the elastic frame further includes third and fourth frame elements each having a clip portion, and the light guide plate is held by the third and the fourth frame elements with the first and the second frame elements of the elastic frame.

5. A back light unit comprising:
a light guide plate having a rectangle shape with first and second edges facing each other;
a light source having a light element to emit light to the first edge of the light guide plate, the light guide plate emitting the incident light from the light source to a liquid crystal display panel as a flat light source;
a light source container to contain the light source and having an opening; and
an elastic frame integrally formed for surrounding the light guide plate, the elastic frame having first and second frame elements facing each other, and the light source container being fitted to the first frame element of the elastic plastic frame,
wherein the first edge of the light guide plate is clipped by the light source container through the opening,
wherein a clip portion to clip the second edge of the light guide plate is provided in the second frame element of the elastic frame,
wherein the first and second frame elements of the elastic frame each include a bottom plate extending to inside of the elastic frame and a side wall connected to the bottom plate, and a peak element is provided on the side wall of the second frame element,
wherein the light source container is fixed between a locking part provided on the side wall and the bottom plate of the first frame element, and the clip portion of the second frame element is formed between the peak element and the bottom plate, and
wherein the peak element is formed along the longitudinal direction of the second frame element of the elastic frame except for both end portions of the second frame element, and the peak element has opposed ends cut away in cross-section.

6. A liquid crystal display device comprising:
a liquid crystal display panel having a liquid crystal layer between a pair of substrates;
a light guide plate to illuminate the liquid crystal display panel, the light guide plate having a rectangular shape and including first and second edges facing each other;
a light source having a light element to emit light to a first edge of the light guide plate, the light guide plate emitting the incident light from the light source to the liquid crystal display panel as a flat light source;
an elastic frame surrounding the light guide plate, including first and second frame elements facing each other, the first and second frame elements each including a bottom plate and a sidewall connected to the bottom plate;
a peak element provided at an intermediate area of the sidewall of the second frame element along the second frame element, the peak element forming a clip portion to clip the second edge of the light guide plate with the bottom plate; and
a light source container fitted to the first frame element to contain the light source, the light source container having a clip shape with an opening facing the second frame element, wherein the first edge of the light guide plate is fitted to the light source container provided in the first frame element and the second edge of the light guide plate is clipped by the clip portion of the second frame element, and wherein the peak element is formed along the longitudinal direction of the second frame element except for both end portions of the second frame element, and both ends of the peak element are cut away in cross-section, respectively.

7. A method for assembling a back light unit having a light guide plate and a light source which emits light to the light guide plate, comprising:

providing an elastic frame having a first and second frame elements facing each other for holding the light guide plate and the light source, each of the first and second frame elements having a bottom plate and a sidewall built on the bottom plate, the side wall of the second frame element having a peak element provided in an intermediate area on said sidewall, the peak element forming a clip portion with the bottom plate;

providing a light source container to contain the light source, the light source container having a clip shape with an opening;

fitting the light source container in the first frame element;

clipping the light guide plate in the clip portion formed by said peak element and said bottom plate;

fixing temporarily a first edge of the light guide plate in the light source container;

expanding the second frame element in an outward direction while twisting the second frame element about an axis of the second frame element;

fitting a second edge of the light guide plate into the expanded and twisted second frame element; and reconstituting the expanded and twisted second frame element to the original shape after containing the light guide plate.

8. The method for assembling a back light unit according to claim 7, wherein the peak element is formed along the longitudinal direction of the second elastic frame element except end portions of the second elastic frame element.

9. The method for assembling a back light unit according to claim 8, wherein opposed ends of the peak element are cut away in cross-section.

10. The method for assembling a back light unit according to claim 7, comprising:

providing the light source container including a metal frame; and fixing the metal frame in the first frame element between a locking part provided in an intermediate area of the side wall and the bottom plate of the first frame element.

11. The method for assembling a back light unit according to claim 7, wherein the elastic frame further includes third and fourth frame elements each having a clip portion, and the light guide plate is held by the third and the fourth frame elements with the first and the second frame elements of the elastic frame.

* * * * *